United States Patent
Dupree

(10) Patent No.: US 9,277,184 B2
(45) Date of Patent: Mar. 1, 2016

(54) APPARATUS AND METHOD FOR MANAGING MEDIA CONTENT

(75) Inventor: Jesse James Dupree, Kennesaw, GA (US)

(73) Assignee: COCKSTER MUSIC, INC., Kennesaw, GA (US)

(*) Notice: Subject to any disclaimer, the term of this patent is extended or adjusted under 35 U.S.C. 154(b) by 746 days.

(21) Appl. No.: 12/408,501

(22) Filed: Mar. 20, 2009

(65) Prior Publication Data

US 2009/0234889 A1  Sep. 17, 2009

Related U.S. Application Data

(63) Continuation-in-part of application No. 11/927,838, filed on Oct. 30, 2007.

(51) Int. Cl.

| | |
|---|---|
| H04N 21/25 | (2011.01) |
| H04N 21/258 | (2011.01) |
| H04N 21/2668 | (2011.01) |
| H04N 21/442 | (2011.01) |
| H04N 21/466 | (2011.01) |
| H04N 21/475 | (2011.01) |
| H04N 7/173 | (2011.01) |
| H04N 21/254 | (2011.01) |
| H04N 21/414 | (2011.01) |
| H04N 21/478 | (2011.01) |
| H04N 21/4784 | (2011.01) |

(Continued)

(52) U.S. Cl.
CPC ......... *H04N 7/17318* (2013.01); *H04N 21/254* (2013.01); *H04N 21/25891* (2013.01); *H04N 21/41407* (2013.01); *H04N 21/4756* (2013.01); *H04N 21/4784* (2013.01); *H04N 21/4788* (2013.01); *H04N 21/47815* (2013.01); *H04H 60/33* (2013.01)

(58) Field of Classification Search
None
See application file for complete search history.

(56) References Cited

U.S. PATENT DOCUMENTS

| | | |
|---|---|---|
| 6,298,482 B1 | 10/2001 | Seidman et al. |
| 6,891,811 B1 | 5/2005 | Smith et al. |
| 7,355,990 B2 | 4/2008 | Smith et al. |

(Continued)

OTHER PUBLICATIONS

Sutel, Seth "Pager-like Device Tracks Radio Audiences" The Palm Beach Post, Oct. 14, 2007, p. 5F.

*Primary Examiner* — Brian T Pendleton
*Assistant Examiner* — Jean D Saint Cyr
(74) *Attorney, Agent, or Firm* — Akerman LLP

(57) ABSTRACT

A system that incorporates teachings of the present disclosure may include, for example, a media server and parsing engine, 3$^{rd}$ party mobile aggregator, client servers, and a plurality of communication devices that are each associated with a user and a user profile. The media server can provide one or more of the plurality of communication devices with access to media content, with the access being provided at a time selected by the user. At least one of the one or more of the plurality of communication devices can transmit a critique of the media content. The media server can award points to the user based on performing the critique, and can transmit the critique and user information from the user profile to the client server. The media server can provide the at least one of the one or more of the plurality of communication devices with access to at least one of services or goods to be purchased with the points. The media server can redeem the points based on a purchase of the at least one of the services or goods using the points. Other embodiments such as the obtaining of end user preferences of content in a natural environment are disclosed.

14 Claims, 12 Drawing Sheets

(51) Int. Cl.
*H04N 21/4788* (2011.01)
*H04H 60/33* (2008.01)

(56) References Cited

U.S. PATENT DOCUMENTS

| | | | |
|---|---|---|---|
| 8,042,050 | B2 | 10/2011 | Cliff et al. |
| 2002/0046138 | A1 | 4/2002 | Fitzpatrick et al. |
| 2002/0116266 | A1 | 8/2002 | Marshall |
| 2002/0199194 | A1 | 12/2002 | Ali |
| 2003/0187739 | A1 | 10/2003 | Powers |
| 2005/0039206 | A1* | 2/2005 | Opdycke .................. 725/35 |
| 2005/0149964 | A1 | 7/2005 | Thomas et al. |
| 2006/0129458 | A1 | 6/2006 | Maggio |
| 2007/0155427 | A1 | 7/2007 | Tran |
| 2007/0192784 | A1* | 8/2007 | Postrel .................. G06Q 10/02 725/23 |
| 2007/0214049 | A1 | 9/2007 | Postrel |
| 2007/0283398 | A1 | 12/2007 | Bowles |
| 2008/0040748 | A1* | 2/2008 | Miyaki .................. 725/46 |
| 2008/0065238 | A1* | 3/2008 | Igoe .................. H04L 12/2809 700/15 |
| 2008/0200207 | A1* | 8/2008 | Donahue .................. H04M 1/7253 455/556.2 |
| 2008/0207182 | A1 | 8/2008 | Maharajh et al. |
| 2008/0209462 | A1* | 8/2008 | Rodov .................. 725/4 |
| 2008/0301112 | A1* | 12/2008 | Wu .................. G06Q 30/02 |
| 2009/0037945 | A1* | 2/2009 | Greig .................. G09F 27/00 725/10 |
| 2009/0083779 | A1 | 3/2009 | Shteyn et al. |

* cited by examiner

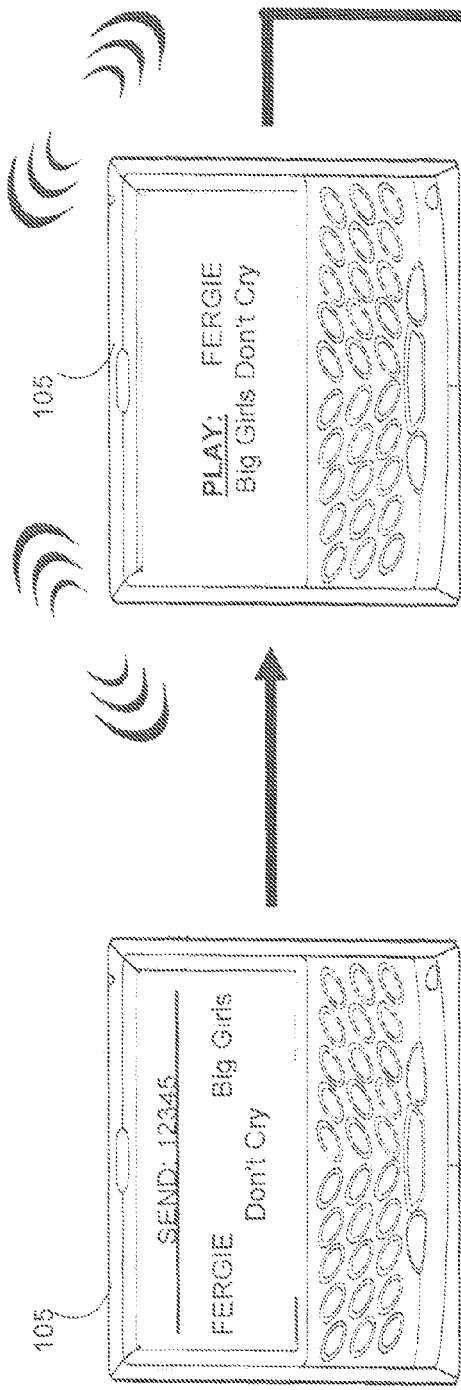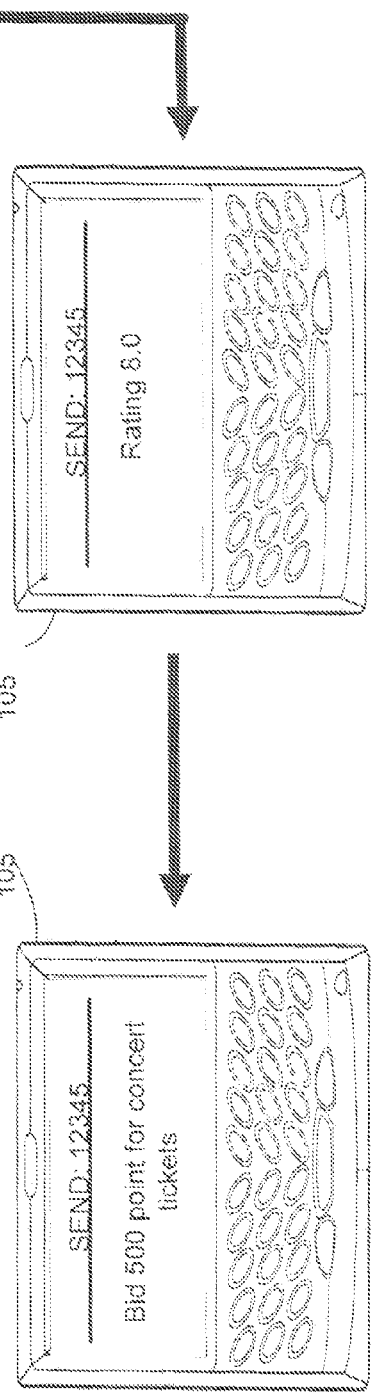

800

900

Rate Song

Artist
Song
Rating      5
Frequency  More
            [ Submit ]

Rate Current Song
Rating       5
Frequency   More
         [ Submit ]
Rated Red - Already Over

APPARATUS AND METHOD FOR MANAGING MEDIA CONTENT

CROSS-REFERENCE TO RELATED APPLICATIONS

This application is a continuation-in-part of co-pending U.S. application Ser. No. 11/927,838 filed on Oct. 30, 2007, the disclosure of which is hereby incorporated by reference.

FIELD OF THE DISCLOSURE

The present disclosure relates generally to communication services and more specifically to an apparatus and method for managing media content.

BACKGROUND

Media content, including music, movies, television programming, video-on-demand and video games, is becoming increasingly accessible to the masses. Consumers can download or otherwise access media content from media sources, such as music or movies from ITUNES® or programming from a cable service provider. Distribution and/or accessability of the media content can be based on a number of factors, including popularity of the content and hardware constraints of the media source. For example, a television station often desires to provide programming that will attract the most viewers so that it can maintain its advertising revenue. As another example, a cable service provider often desires to provide access to a set of movies through video-on-demand that are most popular so that it can maintain its subscribers while reducing the cost of storing unpopular movies. These are examples of how new media is changing the way that the public interacts with content and creates a fragmentation for sources of obtaining content.

The media sources, as well as advertisers, businesses associated with the media content (e.g., retailers selling movie memorabilia, producers of the content itself) and other businesses, often desire to know the consumers' opinions regarding the media content so that they can manage their business accordingly. For example, a radio station often desires to know that a particular song is not well liked so that they can minimize or eliminate the song from their programming to avoid listeners tuning to a different station. As another example, an advertising agency or a business seeking advertising often desires an accurate assessment of whether a television program is being watched by a large amount of viewers so they can accurately assess the value of the advertising.

Contemporary methods of obtaining feedback with respect to media content, including evaluations and audience numbers, are limited, and can be costly and inaccurate. Focus groups are costly, and typically provide for review of large numbers of media content in a sterile environment. Callout research involves receiving a phone call over your home telephone, and evaluating a portion of a song immediately, regardless if it matches your taste/preference for that genre of music. These research methods can be flawed for a number of reasons, including the lack of natural environment for the review of the media content. Additionally, audience demographics are often based on sampling that may not accurately reflect the true audience due to a number of reasons, including the sample size or the sampling methodology.

A need therefore arises for effectively managing media content, and an apparatus and method for managing the media content. A further need arises for such an apparatus and method to include a record of audience preferences for likes and dislikes of the media content.

SUMMARY

The Summary is provided to comply with 37 C.F.R. §1.73, requiring a summary of the invention briefly indicating the nature and substance of the invention. It is submitted with the understanding that it will not be used to interpret or limit the scope or meaning of the claims.

In one embodiment of the present disclosure, a storage medium for managing media content can include computer instructions for: exchanging information with a mobile communication device for establishing a registration for the mobile communication device; providing the mobile communication device with limited access to media content, the limited access being provided at a time selected by a user of the mobile communication device; receiving a critique of the media content from the mobile communication device; awarding points to the user based on performing the critique; providing the critique to at least one of an originator or distributor associated with the media content; providing access to at least one of services or goods to be purchased with the points; and redeeming the points based on a purchase of the at least one of the services or goods.

In another embodiment of the present disclosure, a media management system can include a display; and a controller that is adapted to: exchange information with a server for establishing a registration for the mobile communication device; provide the mobile communication device with access to media content, the access being limited by the server and provided at a time selected by a user of the mobile communication device; receive a critique of the media content and transmit the critique from the mobile communication device; receive notification of an award of points to the user based on performing the critique; provide the critique to at least one of an originator or distributor associated with the media content, wherein the user is provided access to at least one of services or goods to be purchased with the points, and wherein the points are redeemable based on a purchase of the at least one of the services or goods.

In another embodiment of the present disclosure, a method for managing media content can include exchanging information with a communication device for establishing a registration for the communication device; providing a user of a communication device with access to media content; obtaining a critique of the media content from the user; awarding points to the user based on performing the critique; providing the critique to a client associated with the media content; providing access to at least one of services or goods to be purchased with the points; and redeeming the points based on a purchase by the user of the at least one of the services or goods.

In another embodiment of the present disclosure, a method for managing media content can include providing a user of a communication device with access to media content; obtaining a critique of the media content from the user in real-time; and providing a client associated with the media content with real-time access to the critique.

BRIEF DESCRIPTION OF THE DRAWINGS

FIGS. 5a through 5d depict an exemplary method operating in portions of the communication system of FIG. 1;

FIG. 10 depicts a graphical user interface for an end user according to another exemplary embodiment;

DETAILED DESCRIPTION

Figure 1:
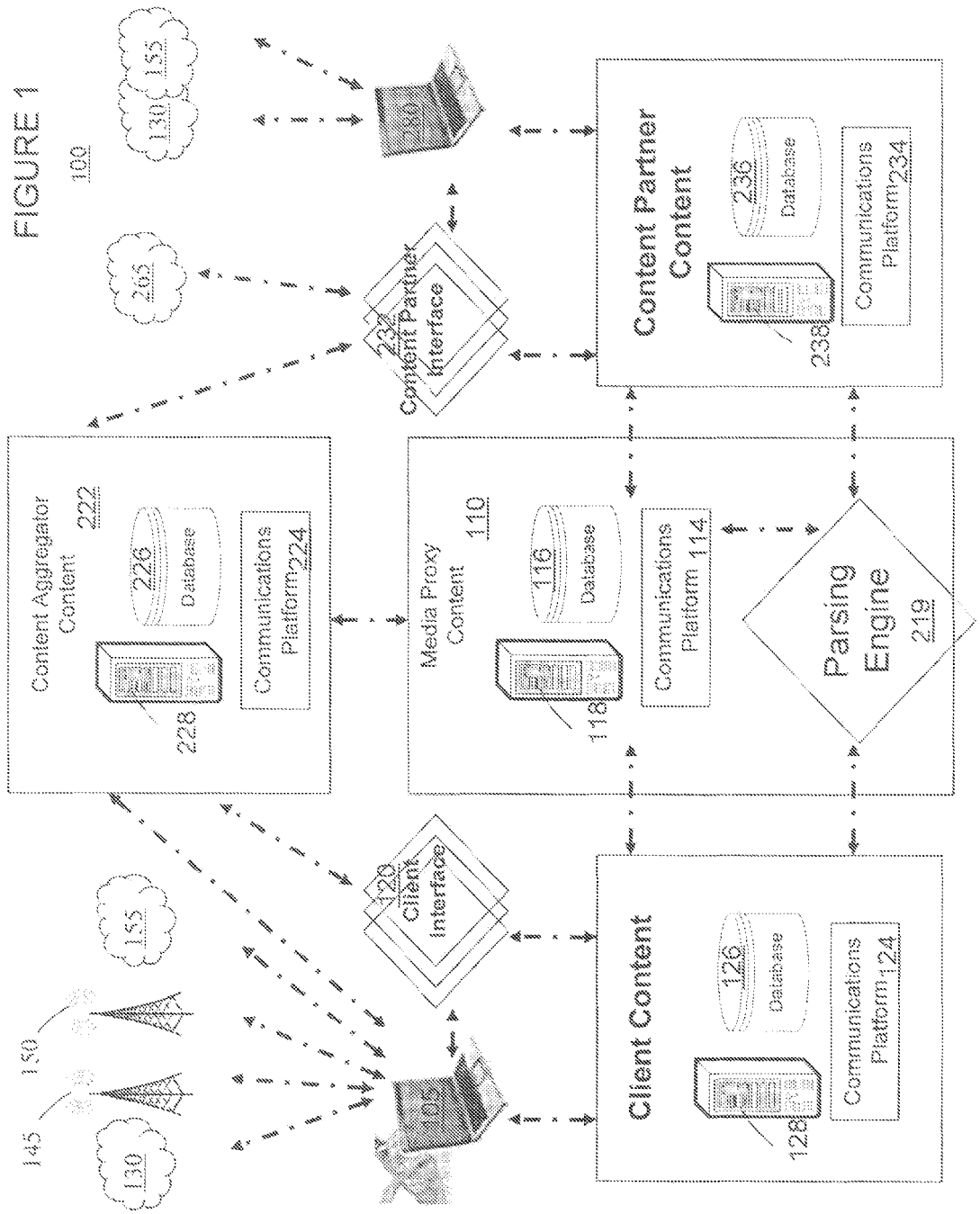
FIG. 1 depicts an exemplary embodiment of a communication system.

FIG. 1 depicts an exemplary embodiment of a communication system 100 employing communication devices 105 communicating by way of wireless access points (WAPs) and/or wired infrastructure with other communication devices, servers, network elements and/or a network proxy or web server, which collectively operate in the communication system 100. The communication devices 105 can be multimedia devices for communicating video, voice, text and/or data, as well as receiving multimedia programming, data, text and/or voice. For example, the communication devices 105 can include lap top or desktop computers, cellular phones, PDAs, set top boxes, and/or other devices that can communicate one or more of video, voice and data signals to a user, subscriber and/or consumer. The communication devices 105 can include various components and combinations of components that provide for the above-described communication, as well as other functions, such as, controllers, processors and memory. In one embodiment, the communication devices 105 can communicate in a multimode communication environment that can communicate via a number of modes of communication, including wired and/or wireless communication, as well as pursuant to various protocols.

The communication system 100 can include a media proxy 110 having a communications platform or interface 114 that utilizes common technology for communicating over an interface (e.g., an IP interface) with one or more of the communication devices 105 and/or one or more client systems or interfaces ("clients") 120, such as through use of a network 130, the cellular network 145, and/or a WiFi network 150. The media proxy 110 can further comprise a memory 116 (such as a high capacity storage medium) embodied in this illustration as a database, and a server, processor or controller 118 that makes use of computing technology such as a desktop computer, or scalable server for controlling operations of the media proxy.

The media proxy 110 can include various components and techniques for the processing and manipulation of data, including user data (e.g., demographics, content critiques, preferences and so forth) and client data (e.g., content, service and/or product being provided, preferences and so forth). The media proxy 110 can include a parsing engine 219 for processing of information provided by one or more of the communication devices 105, the clients 120, the content aggregator 222 and the content partner or provider interface 232.

The parsing engine 219 can be utilized by media proxy 110 for transforming inputs into data structure suitable for later processing. The parsing engine 219 can be applied to various inputs, such as user critiques of media content. The media proxy 110 can also obtain and store keywords or other indicia associated with each of the clients 120. For example, the media proxy 110 can obtain, store and present to a user of communication device 105 the category headings used by a client 120 for storing various types of media content. The media proxy 110 can store or otherwise collect data from the end user's device 105 and a full record/inventory of the media itself from the content partner interface 232. When combined, a collection of analysis can be associated, and actionable information can be taken. The media proxy 110 can also be a pass through to reconcile redemption of reward points for goods/services provided by the content partner interface 232 and redeemable by the end user 105.

The clients 120 can be a software interface where the end user can interact with the media results as expressed directly or via a communication device 105. From here, an end user can view their accumulated points balance, view their media preferences and learn of new contests, media content and other events. The client interface 120 can provide a mirror reflection of the end user's preferences and desires, while the database 126 can communicate with the parsing engine 219 to seek out areas that would be of interest to the end user 105, providing the appearance of a personalized content offering based on user input from device 105. A communications platform or interface 124 can utilize common technology for communicating with the media proxy 110, such as through use of the network 130, the cellular network 145, and/or the WiFi network 150. The clients 120 can further have the memory 126 (such as a high capacity storage medium) embodied in this illustration as a database, and a server, processor or controller 128 that makes use of computing technology such as a desktop computer, or scalable server for controlling operations of the client system.

The network 130 can be a packet-switched network, such as an Internet Service Provider (ISP) network, and can be coupled to a network proxy (not shown), the cellular network 145, WiFi network 150, the media proxy 110, the one or more clients 120, and/or network elements. The ISP network 130 can utilize technology for transporting Internet traffic. Communications between the network proxy, the communication devices 105, the media proxy 110, the one or more clients 120 and other network elements of the communication system 100 can conform to any number of signaling protocols such as a session initiation protocol (SIP), SS7, or a video communications protocol which combines video and voice over a packet-switched network, as well as cryptographic protocols, such as transport layer security (TLS) or secure sockets layer (SSL), to provide secure communications for data transfers.

The network proxy (not shown) can comprise a communications interface that utilizes common technology for communicating over an IP interface with the communication devices 105, the media proxy 110, the one or more clients 120, the network 130, the cellular network 145, and/or the WiFi network 150. By way of the communications interface, the network proxy can direct by common means any of the foregoing network elements to establish packet switched data, voice, and/or video connections between communication devices 105, the media proxy 110 and the clients 120 distributed throughout the communication system 100. The network proxy can include memory (such as a high capacity storage medium), and a controller that makes use of computing technology such as a desktop computer, or scalable server for controlling operations of the network proxy. The network proxy can operate as an IP Multimedia Subsystem (IMS) conforming in part to protocols defined by standards bodies such as 3GPP (Third Generation Partnership Protocol) and beyond.

Under the control of the network proxy, linked packet-switched and circuit-switched technologies such as the cellular network 145, WiFi network 150 and the network 130, such as an ISP network, can communicate with one another. A media gateway can be used and can conform to a media gateway control protocol (MGCP) defined by work groups in the Internet Engineering Task Force (IETF) or by other means. This protocol can handle signaling and session management needed during a multimedia session. The protocol defines a means of communication that converts data from the format required for a circuit-switched network to that required for a packet-switched network. MGCP can therefore be used to set up, maintain, and terminate calls between multiple disparate network elements of the communication system 100. A media gateway can therefore support hybrid communication environments for the communication devices 105, including VoIP terminals.

A central office (not shown) can house common network switching equipment for distributing local and long-distance telecommunication services supplied by network 130 to the communication devices 105. Telecommunication services of the central office can include traditional POTS (Plain Old Telephone Service) and broadband services such as HDTV, DSL, VoIP (Voice over Internet Protocol), IPTV (internet Protocol Television), Internet services, and so on. The communication system 100 can utilize common computing and communications technologies to support circuit-switched and/or packet-switched communications.

The cellular network 145 can support voice and data services over a number of access technologies such as GSM-GPRS, EDGE, CDMA-1X, UMTS, WiMAX, software defined radio (SDR), and other known and future technologies, including Near Field Communications (NFC) and beyond. The cellular network 145 and WiFi Network 150 can be coupled under a frequency-reuse plan for communicating over-the-air with other communication devices of the communication system, including communication devices 105.

The content aggregator 222 can be subscribed or collect a feed, or otherwise observe media content preferences (e.g., newly released songs, movies, video games, etc.) or access the media content (e.g., a web link). The content aggregator 222 can provide the media content preferences at various intervals, including used-determined intervals. The content aggregator 222 can have podcasting capabilities to automatically download media files, such as MP3 recordings. The content partner 232 can provide automatic download media, playback the media within the application interface, or synchronize media content for the interaction by the communication device 105 and or dent interface 120. In one embodiment, the content aggregator 222 can aggregate text-only feeds and also distribute audio recordings and/or other binary content. Along various data paths, the end user preferences and/or access to content, such as through a link to the media content stored in a media source, can be provided. The data can be provided in various formats and approved for distribution to end user devices 105. A record of activity as contained within content aggregator 222 can be stored in the client interface 120 as a history of activity, and content provider 232 for distribution and preference on an individual content basis.

The content aggregator 222 can have a communications platform or interface 224 that utilizes common technology for communicating over an interface (e.g., an IP interface or text messaging) with the media proxy 110, such as through use of the network 130, the cellular network 145, and/or WiFi network 150. The content aggregator 222 can further have a memory 226 (such as a high capacity storage medium) embodied in this illustration as a database, and a server or controller 228 that makes use of computing technology such as a desktop computer, or scalable server for controlling operations of the client system. The content aggregator 222 can be a separate device or sub-system of the communication system 100, or can be contracted out by a $3^{rd}$ party system, such as comprising the media proxy 222, including sharing one or more components with the media proxy. The content aggregator 222 can be a plurality of aggregators, such as aggregators based upon different network distribution types.

The content provider 232 can be one or more media sources and/or can be proxies that retrieve or access media content from other sources, including web-based searches. The content provider 232 can be used to provide the communication devices 105, the media proxy 110 and/or the clients 120 with access to the media content, such as through streaming, progressive download or fall download. Various data paths can be provided for the media content and/or access to that content. Content partner interfaces 232 can be comprised of the sources for public distribution of content (e.g., radio, television, iTunes, etc.) and/or sources of originating content (e.g., media networks, record labels, movie houses, etc.). Storage of the content and/or its sources can be contained within database 236, which can influence whether the content has greater or lesser future distribution per the preferences originated on the end user devices 105.

The content provider 232 can have a communications platform or interface 234 that utilizes common technology for communicating over an interface (e.g., an IP interface) with the media proxy 110, such as through use of the network 130, the, the cellular network 145, and/or WiFi network 150. The content provider 232 can further have a memory 236 (such as a high capacity storage medium) embodied in this illustration as a database, and a server or controller 238 that makes use of computing technology such as a desktop computer, or scalable server for controlling operations of the client system. The content provider 232 can be a separate device or sub-system of the communication system 100, or can be incorporated with other components of the communication system, such as being incorporated into a client 232, including sharing one or more components with the client system. Communications between end user device 105, by way of content aggregator 222, and indicating a preference on the content stored in 236 can pass through the media proxy 110 and parsing engine 219.

Other data can be provided between two or more of the communication devices 105, the media proxy 110, the clients 120, the content aggregator 222 and the content provider 232. For example, data paths can provide for the transmittal of audience data, such as information collected by the media proxy 110 that is associated with feedback by a user corresponding to a particular media content (e.g., a song, movie, advertised product) or the transmittal of client data, such as client-sponsored activities, including concerts, contests or other events. In one embodiment, data paths can provide for the uploading of playlists by the client 120 from the media proxy 110, such as based upon a collection of critiques or evaluations of various media content by the users of communication devices 105. In another embodiment, communications originated via the client interface 120 can pass into the media proxy 110 by way of a data path. Communications originated by end user device 105 will pass into the media proxy 110 by way of the content aggregator 222 and the path of 260. Communications can be in the form of content preferences, accumulation and redemption of reward points and or any activities as allowed for interaction through the client interface 120.

As another example, data paths can provide for the transmittal of user or consumer data, such as the demographics or other information associated with the user (e.g., age, sex, income and so forth that can be maintained in a user profile), requests for feedback on media content (e.g., free one-time access to a song that the user can listen to at his or her leisure and provide feedback to earn points), the individual feedback by a user corresponding to a particular media content (e.g., a low-rated song that allows a radio station to adjust its programming accordingly), promotion of upcoming events corresponding to one or more of the clients 120, or user interaction with the media proxy 110, such as monitoring, redeeming or donating points awarded for media content critiques.

The user interaction with the media proxy 110 through use of the communication device 105 along the data paths can also include populating user playlists (e.g., with songs that the user has provided with a favorable critique), purchasing particular media content (e.g., for content that the user has provided with a favorable critique and desires to subsequently view and/or listen to), purchasing other goods or services (e.g., concert tickets, hard goods and so forth), blogging or otherwise communicating with other users (e.g., other users that have provided critiques similar to the users), and/or participating in contests or other events (e.g., an auction that accepts the user's points as payment or a media content-related quiz show that awards points). Contests, events, and so forth can be based on the availability and participation by the content partners who make their presence known on client interface 120 via content partner interface 232. The contests may or may not have any connection to the content that is being distributed to the end user for their reaction through the content aggregator 222. They can be instead, a secondary program solely based on providing a new means of distribution (e.g., live) and allowing and/or rewarding access to such an experience through their normal interaction with the media proxy 110.

Data paths, such as through use of device 280, can be used for originating various media content directly from the content provider 232 towards the user of the communication device 105, including from the client 120 where the content provider is associated with the client. Data paths can also be used for providing the various media content indirectly from the content provider 232 to the user of the communication device 105, such as where the media proxy 120 stores the media content or otherwise provides the access thereto.

Communication between two or more of the devices 105, the content partner interface 232, the media proxy 110, the content aggregator 222 and the client interface 120 can be achieved by other means, including other networks 155, such as a virtual private network. Similarly, other connection points or techniques 265 can be used for providing data flow between the content partner interface 232 and the content aggregator 222.

Figure 2:
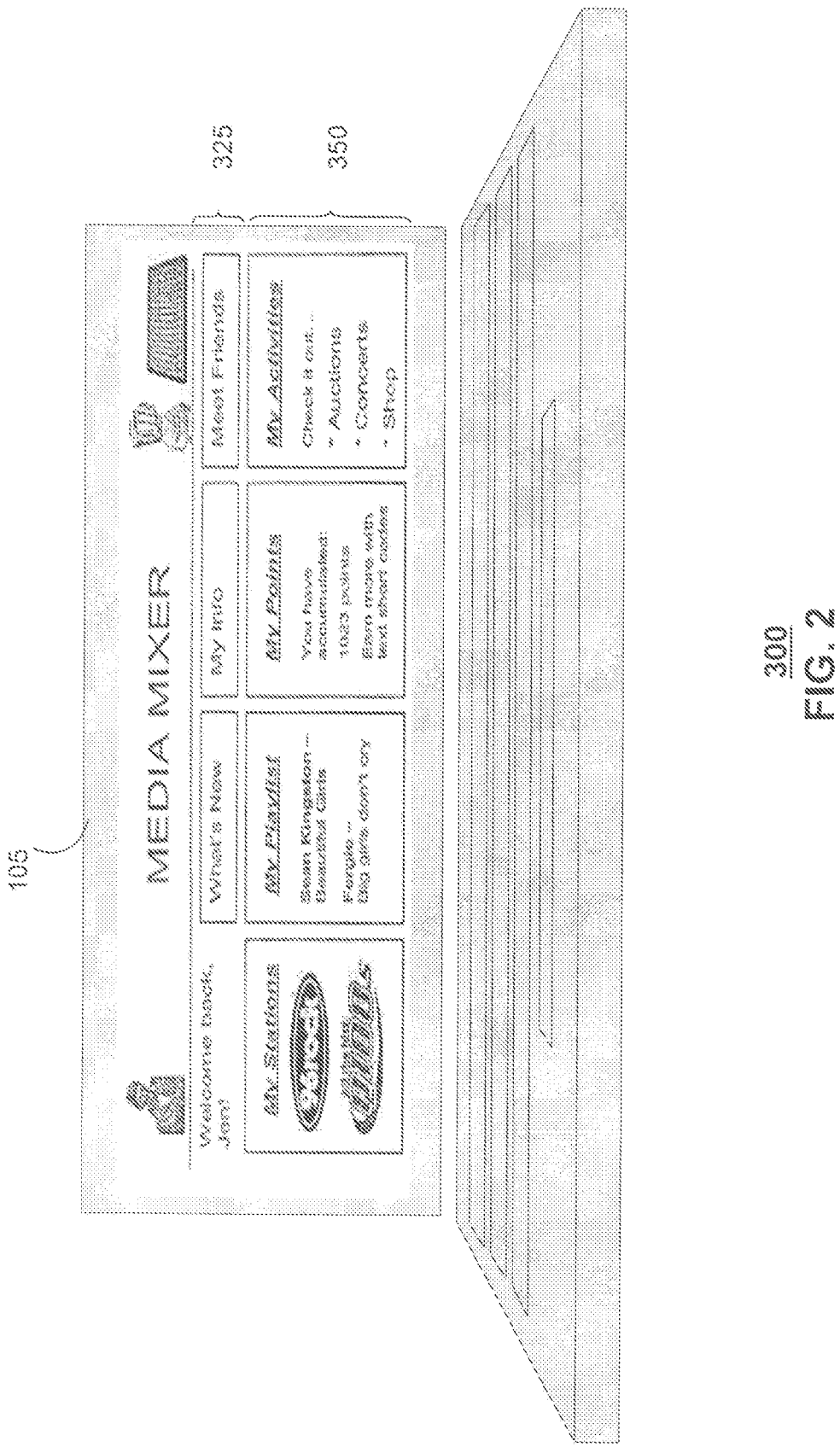
FIG. 2 depicts a graphical user interface for a consumer in the communication system of FIG. 1.

Referring to FIG. 2, a graphical user interface (GUI) 300 is shown for a user of a communication device 105 and represented as the client interface 120, which in this exemplary embodiment is a lap top computer providing a web portal. GUI 300 can present a content push tool bar 325 that allows a user to navigate through new information, user information, and communication with other users. GUI 300 can also present a content pull toolbar 350 that allows a user to navigate through favorite media sources, playlists, points, and activities based on usage and preferences. Pull content can include ways to provide personalization of end user details, a way to initiate finding friends and to preference content distribution (e.g., TV & radio stations). The push content can include receiving feedback on activities, such as playlist creations based on likes/dislikes recorded via the content aggregator 222, information on new content that is similar to preferred likes, accumulation of points/rewards for redemption and updates on activities, such as concerts, auctions, and so forth for end user participation.

Figure 3:
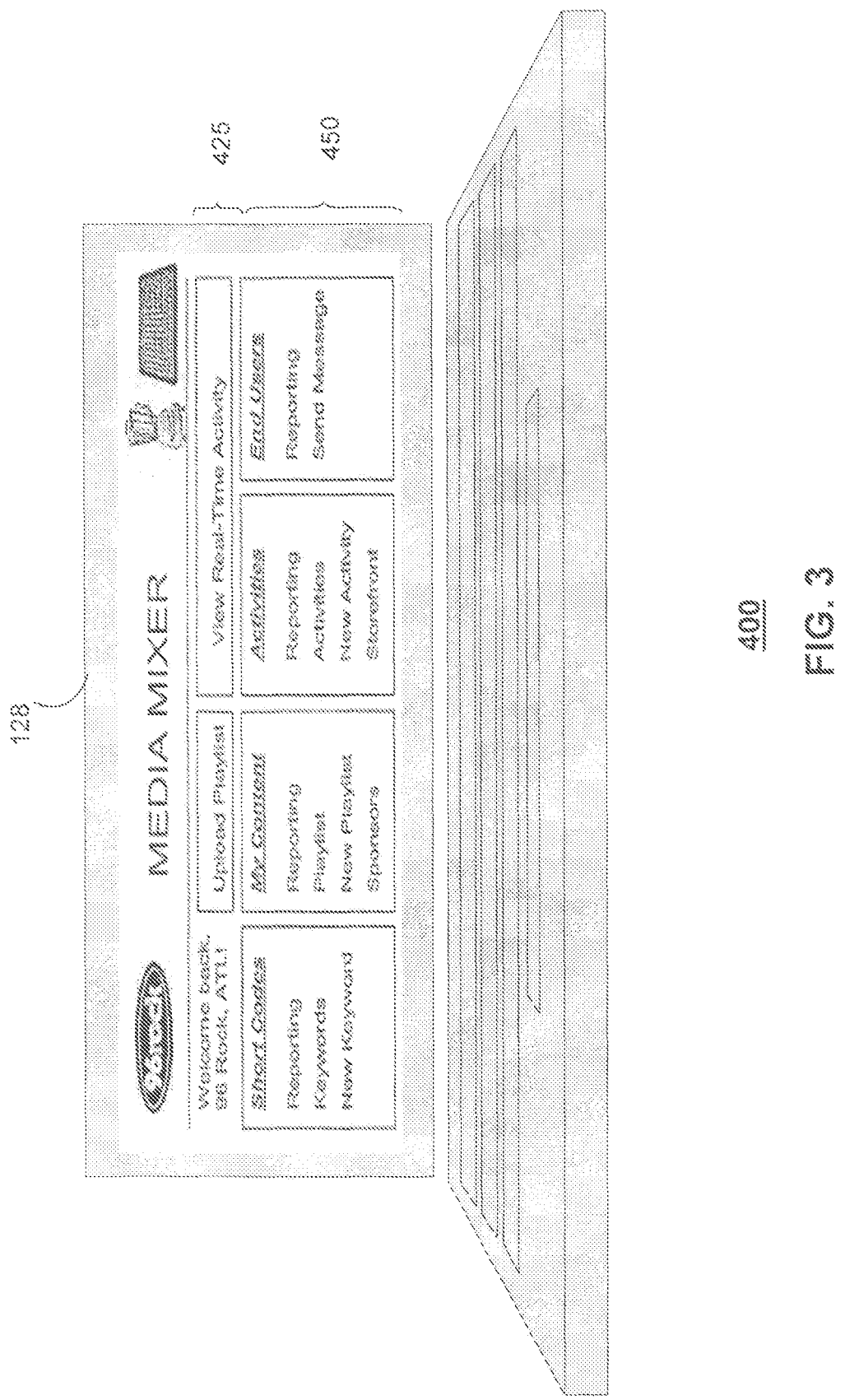
FIG. 3 depicts a graphical user interface for a content partner client in the communication system of FIG. 1.

Referring to FIG. 3, a graphical user interface (GUI) 400 is shown for a content partner interface 232, which in this exemplary embodiment is utilizing a lap top computer providing a web portal. GUI 400 can present a content pull tool bar 425 that allows the content originator or distributor 232 to navigate through playlist monitoring via real-time activity associated with the client and observing one or more users or consumers and pull reporting. GUI 400 can also present a content push toolbar 450 that allows a content originator and/or distributor to initiate new keywords for the particular user of the communication device, and offer new media content, and contests/activities for interaction. The toolbar 450 can also allow for navigation through activities including reporting, descriptions of the activities, descriptions of new activities and merchandising. The toolbar 425 can additionally allow for navigation through identifiers of users associated with the communication devices 105 (e.g., names, addresses and so forth) that can include reporting and sending messages.

Figure 4:
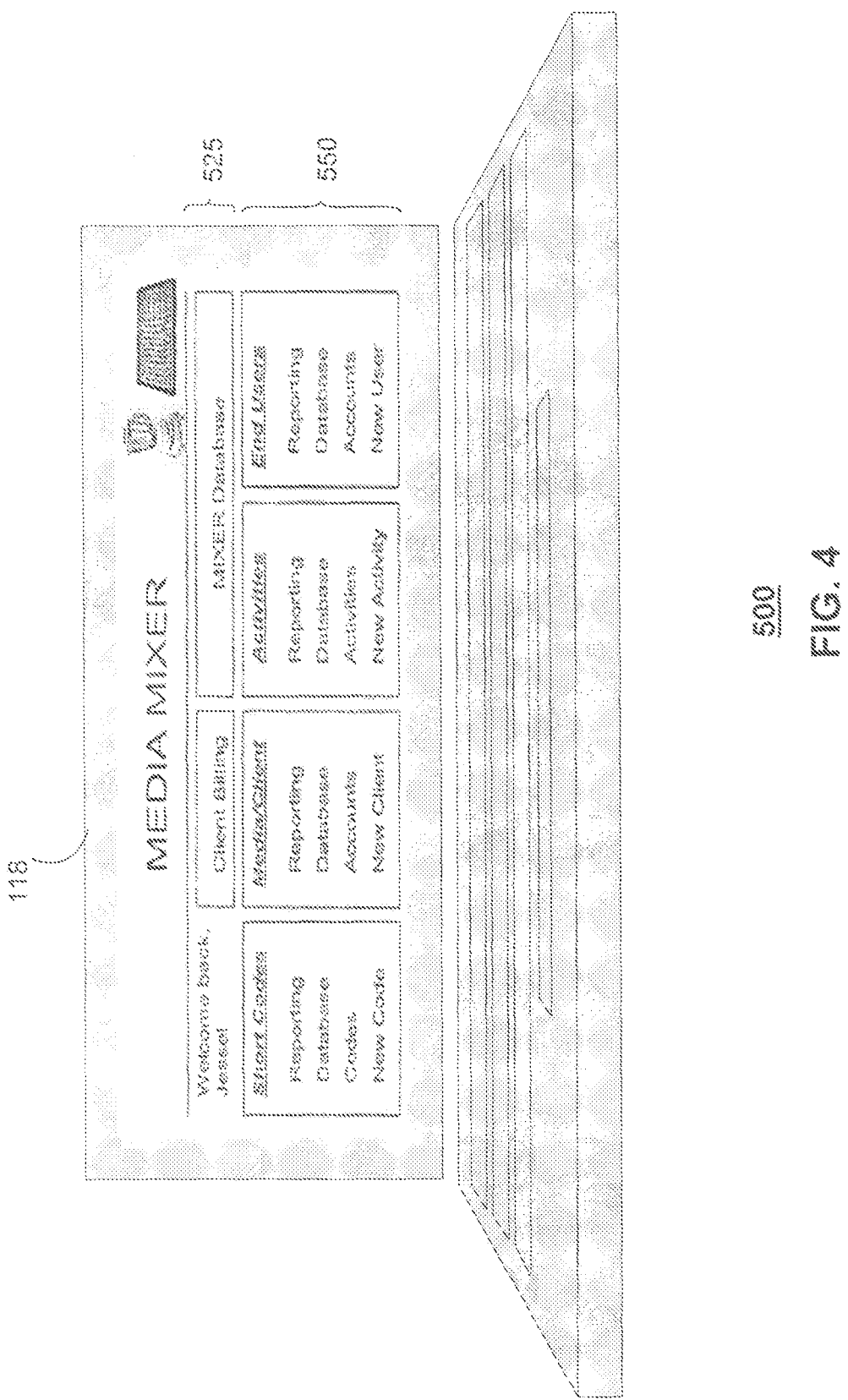
FIG. 4 depicts a graphical user interface for an administrator in the communication system of FIG. 1.

Referring to FIG. 4, a graphical user interface (GUI) 500 is shown for an administrator of media proxy 110, which in this exemplary embodiment is utilizing a lap top computer providing a web portal. GUI 500 can present a content push tool bar 525 that allows the administrator to navigate through client billing and the proxy database. GUI 500 can also present a content pull toolbar 550 that allows a user to navigate through identifiers of the communication devices 105 (e.g., short codes) that can include reporting, description of associated databases, description of codes and description of new codes, and identifiers of clients that can include reporting, description of associated databases, description of accounts and description of new clients. The toolbar 550 can also allow for navigation through activities including reporting, descriptions of associated databases, descriptions of the activities, and descriptions of new activities. The toolbar 450 can additionally allow for navigation through identifiers of users associated with the communication devices 105 (e.g., names, addresses and so forth) that can include reporting, description of associated databases, description of accounts and description of new users. FIG. 500 shows an administrative function that can view all content communicating throughout the media proxy 100 with limited interaction. The main function is to control the business model of the media proxy 110, as well as control the interaction of the content originators/distributors 232 and shut down an end user 105 due to excessive use/abuse.

FIGS. 5a through 5d depict an exemplary method 600 utilizing a communication device 105 (e.g., a PDA, consumer device, etc.), and operating in portions of the communication system 100. In FIG. 5a, a user can send a text message using a predefined short code to download or otherwise access/ interact with media content, such as provide a song preference, suggest a song for airtime, or receive an MP3 of the song for review. The request for the media content can be in response to a message sent from the media proxy 110 or can be initiated by the content distributor/originator, or by the end user such as in response to hearing a portion of the song on the radio or reading about a newly released song in a magazine. In FIG. 5b, the user can play the song at the time and place he or she desires to listen to and review the song. In FIG. 5c, the user can send a message to the media proxy 110 that includes the critique or review of the song. For example, the critique can be a simple like or dislike that is selected from a selection presented on the communication device 105 or is typed into the text message. Other critiques can also be provided, such as ratings on a scale or a written evaluation. In response to the review or critique of the media content, the user of the communication device 105 is awarded points. In FIG. 5d, the user can utilize those points, such as bidding for concert tickets during an auction.

Additional data flow can occur as required by the content aggregator 222 per the guidelines outlined by the Mobile Marketing Association. Data flow can vary based on the needs of the content creator/distributor 232 and what they are trying to accomplish with the end user 105.

Figure 6:
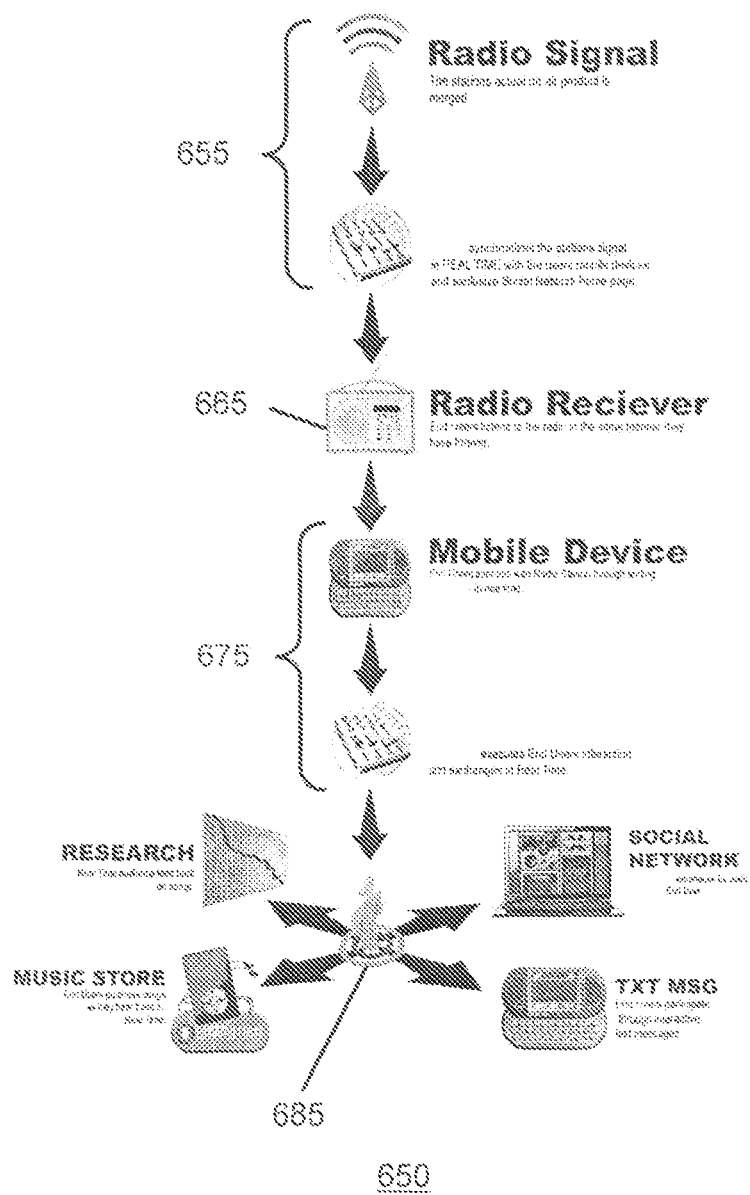
FIG. 6 depicts a process according to one exemplary embodiment.

Referring to FIG. 6, a process flow 650 for one or more of the exemplary embodiments are described herein. The process 650 can include a step 655 where the media content is merged with control or other signals, such as from various components of system 100. This can include synchronizing signals from a radio station or other media source with a user's mobile device and/or with a social network page associated with the user. In one embodiment, the synchronization or a portion of it can occur in real time.

In step 655, the synchronized signal which includes the media content is received by the user listening device, which can be a separate radio receiver and/or can be the user mobile device. In step 675, the end users can interact with system 100, which can include direct or indirect interaction with the radio station or other media content source. The interaction, which can occur by texting, option selections, and/or voice-to-text conversions, can be in real-time. The interaction can be information sent by the end user, as well as information received by the end user, including from the media content source and third parties, such as a marketing entity or other end users that are collectively providing a review of the media content.

In one embodiment, the end user can contact other end users to allow them to also provide feedback. For instance, an end user can commence listening to a song and during the song send a notification to one or more other end users to also listen to the song. The notification can be based on user profiles, such as a pre-selection of individuals that are to receive the notification. In another embodiment, group feedback can be provided that is blind, where the various end users are unaware of the feedback of each other. However, the present disclosure contemplates interaction or other communication occurring between the end users, such as texting to provide feedback amongst the end users or to emphasize a portion of the media content that the end user believes is deserving of high marks and so forth. In one embodiment, symbols or other pre-selected characters can be transmitted among the end users to signify feedback associated with media content or portions thereof, including during the playing of the media content.

In step 685, the end user can engage in the various forms of interaction, including ext messaging social networking, providing the real time audience feedback on the media content, and purchasing the songs in real time as they are being heard.

Figure 7:
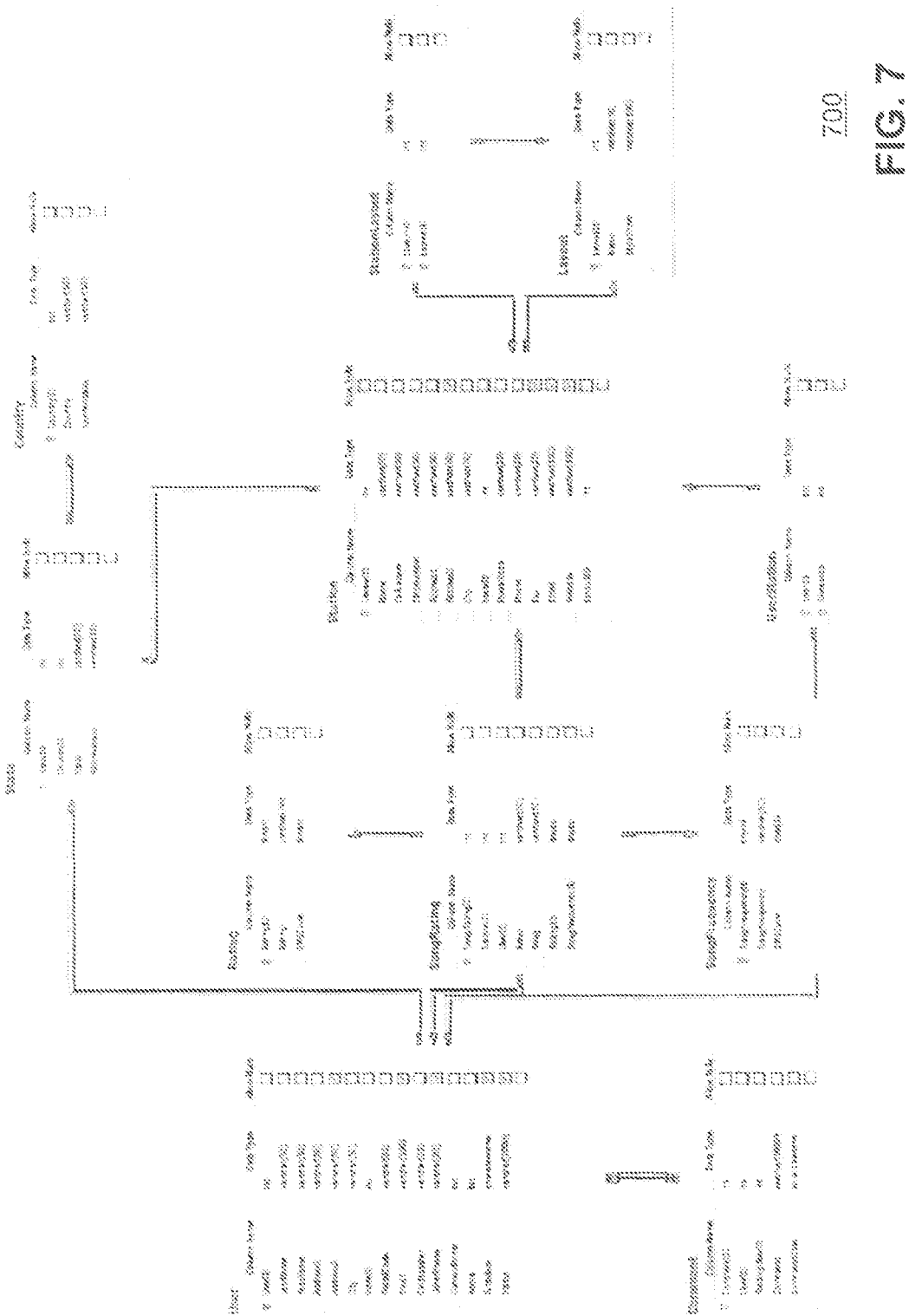
FIG. 7 depicts an Entity Relationship Diagram according to one exemplary embodiment.

Referring to FIG. 7, an Entity Relationship Diagram (ERD) 700 is shown that can be used for storing various information related to process 650. For instance. ERD 700 can include user data, comments, ratings, song rating, song frequency, geography data, media sources, layouts and user stations. The data can be organized and maintained at a central depository and/or can be maintained in a distributed system. In one embodiment, the data is updated in real-time so that entities, such as radio stations have access to the data in real time. While this exemplary embodiment, describes the data being associated with real time feedback for songs that are broadcast from radio stations, the present disclosure contemplates providing real time feedback using one or more of the components and/or techniques described herein for other media content, such as video, video games, and so forth.

Figure 8:
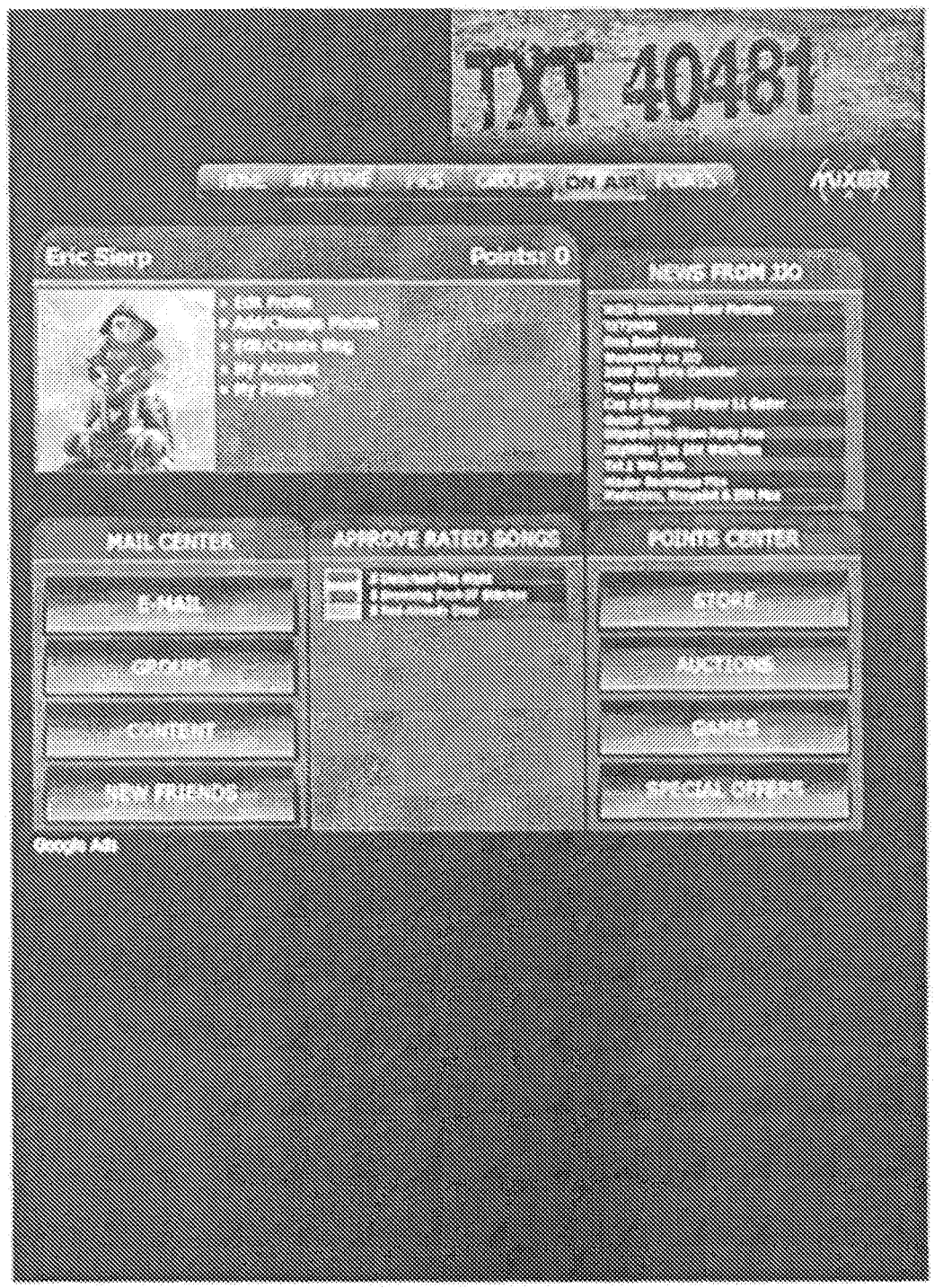
FIG. 8 depicts a graphical user interface for an end user according to one exemplary embodiment.
Figure 9:
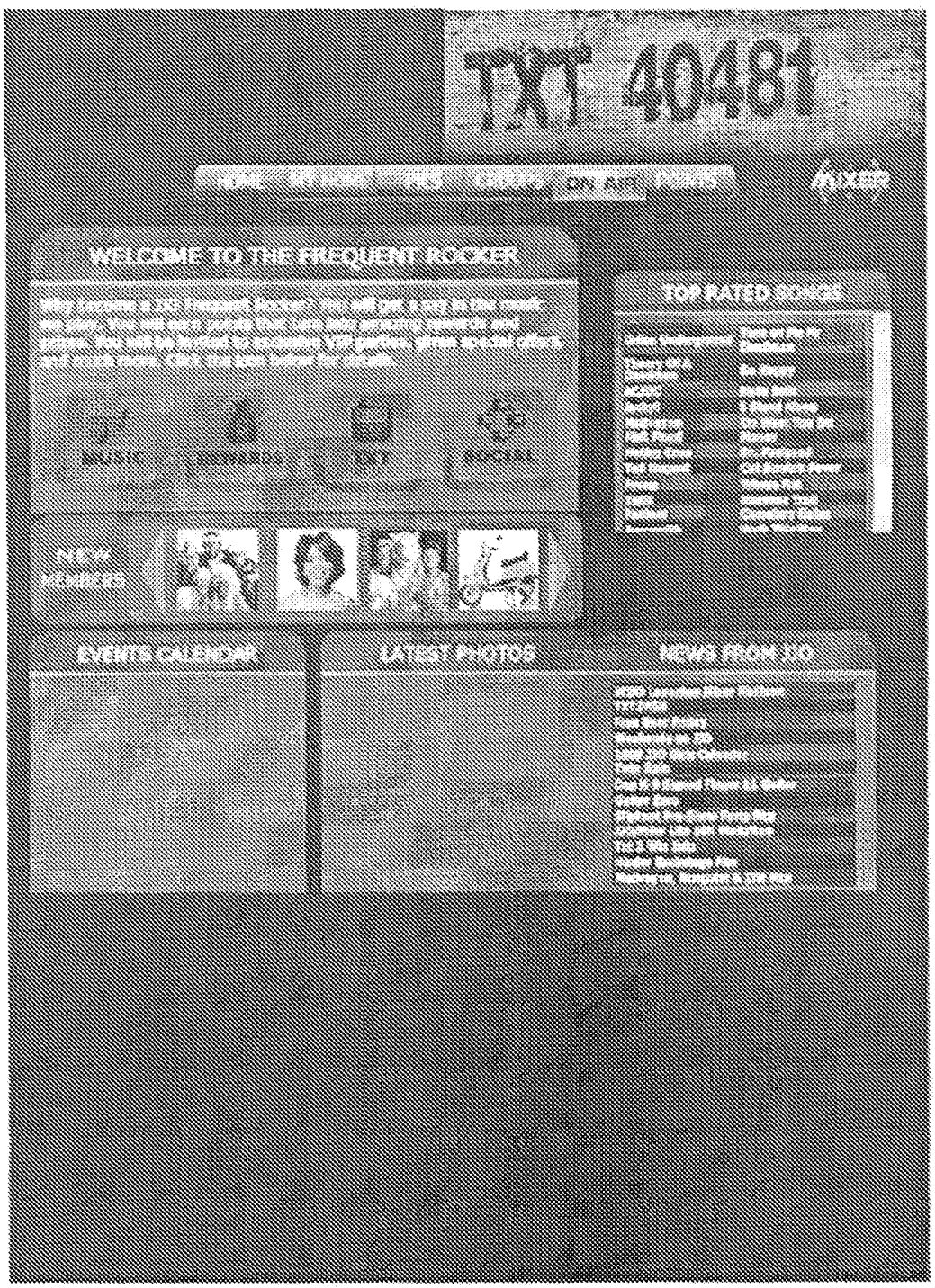
FIG. 9 depicts a graphical user interface for an end user according to another exemplary embodiment.

Referring to FIGS. 8 and 9, GUIs 800 and 900 are shown for use by an end user such as part of a social network site. GUI 800 allows a user to access email, media content, friends, news or other events associated with a media content source. GUI 800 allows a user to approve rated songs and provides a points center for use of the incentivized rating system associated with the media content, as well as a real time display of the points of the user. For example, the points earned through providing feedback on the media content can be utilized for purchasing items in the store, participating in auctions using the points, playing games with the points and/or other special offers associated with the points, such as concerts and so forth. The GUI 800 can be customized using images and the like.

In one embodiment, the GUI 800 can provide a user profile that stores user preferences such as preferences for receipt of media content for reviewing, including the particular format, time of day and so forth. In another embodiment, the user profile can store the identity of other users, such as for providing messages or other communications to a number of individuals without the need to identify each one individually. GUI 900 allows a user to access music or other media content to be reviewed, a list of rewards for such feedback, text messaging associated with the feedback, and/or social networking including blogs.

Referring to FIG. 10, a GUI 1000 is shown that can be utilized for providing feedback for the media content that has been reviewed. For instance, the GUI 1000 can be presented on the mobile device of a user, such as a cell phone. In one embodiment, the GUI 000 can be presented on the same mobile device that presents the media content being reviewed. For instance, the presentation of the GUI 1000 can occur after the media content is finished playing.

Figure 11:
FIG. 11 depicts a graphical user interface for an end user according to another exemplary embodiment.

Referring to FIG. 11, GUI 1100 is shown for use by an end user such as part of a social network site. GUI 1100 allows for ranking of friends, such as "Real" and "Just." GUI 1100 allows for ranking the "Lab Rats" work, such as studio media content. The profile picture can be rectangular as opposed to square because video is generally rectangular. Music test charts can be presented, as well as an audio player. A DJ Lounge can be presented where radio station DJs interact with users. This allows listeners to interact with the DJ that is on the air in their "Lounge."

In one exemplary embodiment, site registration with wireless device verification can be utilized in place of or in combination with an email registration process. The exemplary embodiments can remove the ability to register multiple times with the same site. By tying an account to a wireless device the ability to register multiples times can be reduced as it becomes cost prohibitive. In one embodiment, when a user registers they can provide an identification associated with the wireless device, such as a telephone number. Upon completing the registration, a message can be sent to the user's device. This message can be in various formats such as SMS (Short Message Service), MMS (Multimedia Messaging Service), WAP (Wireless Application Protocol), or any other transport or delivery method across a wireless network. The same method can work across different wireless network technologies including, but not limited to, CDMA (Code Division Multiple Access), GSM (Global System for Mobile Communications), and satellite device networks. Upon receiving the message an action can be performed by the user verifying they received the message and hence own the wireless device they registered with.

In one embodiment, a simple response verification can be implemented. For instance, a user can register on site and supply a wireless device number. A verification message can then be sent to the wireless device. The user can reply to the verification message on the wireless device. The site can receive a wireless device verification response and activate users site profile.

In another embodiment, a wireless code verification can be implemented. For instance, a user can register on site and supply a wireless device number. A verification message can be sent to the wireless device containing a verification code. The user can access a screen on the site that allows them to enter the verification code sent to their device. Upon the code being verified, the users profile can be activated.

In another embodiment, a site code verification can be implemented. For instance, the user can register on site and supply a wireless device number. The user can access a screen on the site that displays a verification code. A verification message can be sent to the wireless device. A user can reply to the verification message and can enter a verification code in the message. The site can receive a wireless device response and upon the code being verified the users profile can be activated.

In one embodiment, a system can be provided to allow for interaction between end users and other entities, including media content sources, such as a radio station. The system can include a Short Message Service (SMS) gateway that then communicates with the backend (in this embodiment a PHP). A cell phone can operate to take the place of the short code so that the cell phone can receive text. In one embodiment, when the cell phone receives the text, it can send the text to the SMS gateway.

The embodiments described herein can provide for real-time or near real-time data flow between the various entities, such as the users, distributors and/or originators. For example, a user can listen to a particular media content and then provide feedback at his or her convenience, which includes immediately or at a later time. This can allow a user to have real-time access to the media content and real-time access to providing the feedback or critiques of the media content. The real-time access can extend to the originator, distributor or the media proxy 110 for receiving and reviewing the critiques of the media content.

The embodiments described herein allow a user, client or other entity to find out what song or show is currently being played. For example, a user can send a text message or other signal requesting identification information for the media content that is currently being played. The identification information can be provided in real-time or near real-time. In another embodiment, a user, client or other entity can obtain identification information for previously played media content. For example, a user can send a text message or other signal to media proxy 110 requesting identification information for a song that was played ten minutes ago. This allows users who do not have immediate access to a communication device to know what media content has been played, such as if they heard it from someone else's communication device. The time period and the number of media contents identified can vary for the identification information provided. In yet another embodiment, a user can purchase media content, such as songs or movies, directly from a play list associated with a content provider. The provider, such as a TV station, can have restrictions for selling the content, such as age-based ratings.

Upon reviewing the aforementioned embodiments, it would be evident to an artisan with ordinary skill in the art that said embodiments can be modified, reduced, or enhanced without departing from the scope and spirit of the claims described below. For example, the content partner/distributor can be charged a fee with the option for premium activities for the end user as well. In one embodiment, the fee can be adjusted (e.g., reduced or eliminated) based upon the amount of participation in critiques, activities or other data generating activity. The media proxy 110 can monitor other user activity to generate data for clients. For example, links to merchandising can be provided and user preference data can be obtained based upon accessing those links or purchases made from the websites associated with the links (e.g., data transmitted from the website confirming a purchase was made). The requests for critiques can be directed to particular users based upon information in their user profiles.

In another embodiment, embedded signals can be provided in the media content as a trigger for the user. For example, a communication device 105 can detect an embedded signal in a song which triggers a request for feedback that is generated by the device 105.

These are but a few examples of modifications that can be applied to the present disclosure without departing from the scope of the claims. Accordingly, the reader is directed to the claims section for a fuller understanding of the breadth and scope of the present disclosure.

In another embodiment not shown, the communication system 100 of FIG. 1 can employ an IPTV broadcast media architecture, including at least one super head office server (SHS), one or more video head servers (VHS) and one or more video head offices (VHOs). The IPTV broadcast media architecture can be overlaid or operably coupled with communication system 100 as another representative embodiment of communication system 100. The SHS can receive national media programs from satellite and/or media servers from service providers of multimedia broadcast channels, and can forward IP packets associated with the media content to the VHS via a network of VHOs according to a common multicast communication method. The VHS can then distribute multimedia broadcast programs to a media receiver, such as through set-top boxes associated with televisions located in homes. Unicast traffic can also be exchanged between the media receivers and subsystems of the IPTV media system for services, such as video-on-demand (VoD).

In another embodiment not shown, the communication system 100 of FIG. 1 can employ a IP Multimedia Subsystem (IMS) network architecture. The IMS network architecture can be overlaid or operably coupled with communication system 100 as another representative embodiment of communication system 100. The IMS network architecture can include a Home Subscriber Server (HSS), a tElephone NUmber Mapping (ENUM) server, and network elements of an IMS network. The IMS network can be coupled to IMS compliant communication devices (CD) or a Public Switched Telephone Network (PSTN) CD using a Media Gateway Control Function (MGCF) that connects the call through a common PSTN network. The CDs can be fixed, mobile, wireless and/or wired devices.

In one exemplary embodiments, reports can be generated based on the following criteria: 1. Current; 2. Library; 3. Artist; and 4. Real Time. The reports can be generated based on default settings, as well as a list of options for adjusting the reports, such as by the Radio Program Directors.

For example, the reports can include data associated with a Burn Formula for a song. The default formula for scoring burn can be based on the percentage of participants that gave a particular song a LESS rating:

(# of Less Scores)/(# of Participants)×100=BURN %

In one embodiment, the reports can include data associated with a Score Formula. The over all score of a song formula default can be the mean average of the 1 through 5 scale of all of the participants that scored that particular song:

(Total of 5 Scale Scores)/(# of Participants)=SCORE

In one embodiment, the reports can include data associated with a Custom Formula. For instance, Programmers can assign values and build their own formulas to calculate burn and or overall score. Burn can be the measurement of how tired the audience is becoming of a particular song. Score can be the measurement of a songs strength or weakness. Participants can be End Users that have scored a song. Sample can be a collection of participants that have ranked the same song. Current can be the newest songs featured on the station. Library can be the non-current songs featured on the station.

In one embodiment, a Current Test report can be generated. This report ranks songs that are considered current for a defined date range, such as one week. An even number of participants for every song and defining a specific date range can be utilized for this function. For instance, the Programmer can set the date range; select songs to be included; define the age range; define gender; and customize the aggregation formula. In one embodiment, the default settings can be an age of twelve or higher; and male and female. The aggregation can rank the songs based on "Score." The report can show the following:

TABLE 1

| | | | Demo: Men 18-34 | | | | | | | |
|---|---|---|---|---|---|---|---|---|---|---|
| RANK | ARTIST | TITLE | SCORE | BURN | 1 | 2 | 3 | 4 | 5 | Sample |
| 1 | Metallica | Day That Never Comes | 4.23 | 27% | 11% | 10% | 14% | 30% | 35% | 124 |
| 2 | Seether | Rise Above This | 4.21 | 31% | 9% | 11% | 23% | 22% | 14% | 67 |

In one embodiment, a Library Test report can be generated. This report can rank a large number of songs (such as 400 to 600) scored by a large number of participants (such as 100 to 200 or more). In another embodiment, the report can generate the rank based on "like" participants, such as a certain amount of people that ranked the same songs as each other. The Programmer can set date range; select songs included; select minimum number of participants; select a range of participants; define an age range; define gender; customize aggregation formula; and/or have the ability to display % of 1, 2, 3, 4 and 5 scores. In one embodiment, the default settings can be an age of twelve or higher; and male and female. The aggregation can rank the songs based on "Score." The report can provide the top 400 songs scored by at least 25 Participants. The report can show the following:

TABLE 2

| | | Demo: Persons 12+ | | | |
|---|---|---|---|---|---|
| RANK | ARTIST | TITLE | SCORE | BURN | SAMPLE |
| 1 | Metallica | Day That Never Comes | 4.23 | 27% | 134 |
| 2 | Seether | Rise Above This | 4.21 | 31% | 213 |

In one embodiment, an Artist Test report can be generated. This report can compile and rank all of the individual songs scored by a particular artist. The Programmer can set the date range; select the minimum of participants; select a range of participants; define the age range; define gender; and/or customize aggregation formula. In one embodiment, the default settings can be an age of twelve or higher; and male and female. The aggregation can rank the songs based on "Score." The report can show the following:

TABLE 3

Demo: Women 25 to 54

| RANK | TITLE | SCORE | BURN | 1 | 2 | 3 | 4 | 5 | SAMPLE |
|---|---|---|---|---|---|---|---|---|---|
| 1 | Day That Never Comes | 4.23 | 27% | 11% | 10% | 14% | 30% | 35% | 314 |
| 2 | Rise Above This | 4.21 | 31% | 9% | 11% | 23% | 22% | 14% | 245 |

Figure 12:
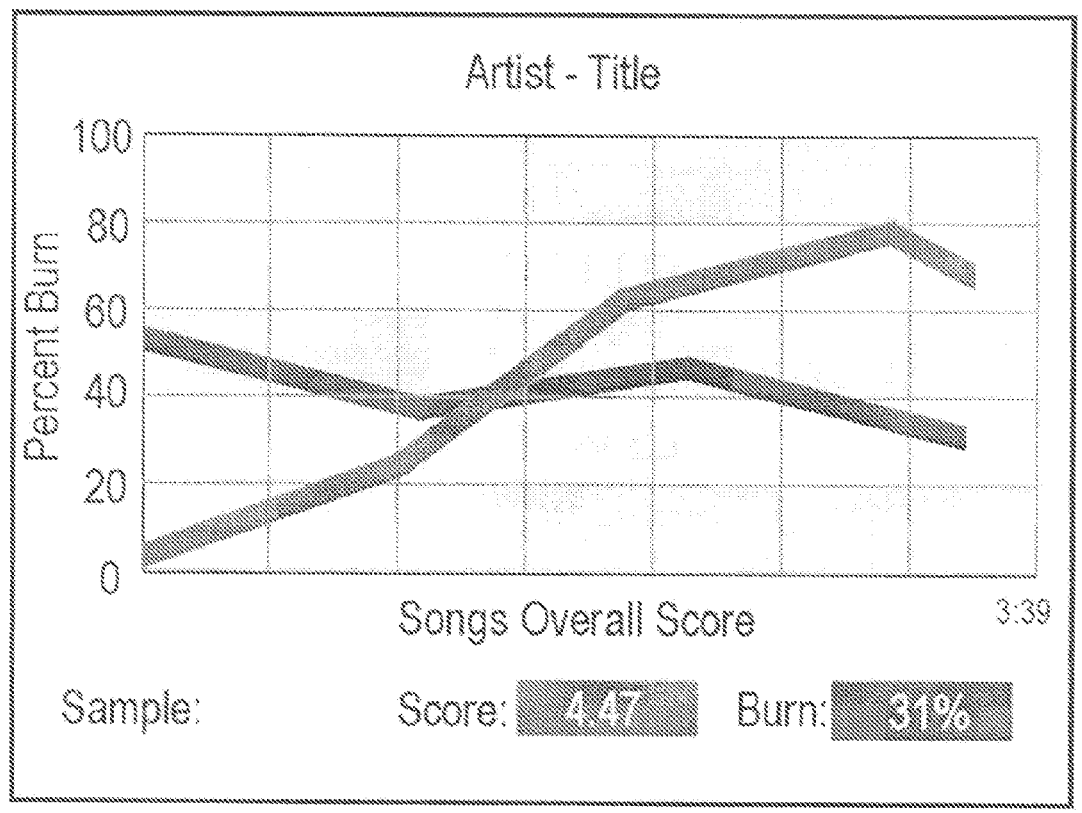
FIG. 12 depicts a real-time test data report according to an exemplary embodiment.

In one embodiment, a Real-Time Test report can be generated. This report can maintain scoring of a song as it plays on the radio, where it is updated and end users score the song. For example, the display can present both BURN and SCORE. In one embodiment, the data can update the sample size (number of end users that have scored the song). The Programmer can customize aggregation formula. In one embodiment, the default settings can be an age of twelve or higher; and male and female. The aggregation can rank the songs based on "Score." The report can be as depicted in FIG. 12

In one embodiment, a hyper mode can be utilized that allows end users to switch from one time feedback mode to continuous feed back mode. For instance, this can be used with television and movie reviewing, although the present disclosure contemplates its use with music, such as to create sample library and current tests. In one embodiment, the hyper mode can be sued to test station TV commercials, morning show clips, station promos, and so forth. In another embodiment, hyper mode can be used in conjunction with pages built in the social network. For instance, end users can log on and click a link in the "Station News" section. They can be given the prompts and instructions to enter "Hyper Mode" and execute the test. Results format can be dictated by the test created in hyper mode.

The present disclosure contemplates the use of a machine in the form of a computer system within which a set of instructions, when executed, may cause the machine to perform any one or more of the methodologies discussed above. In some embodiments, the machine can operate as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine can comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure can include broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system can include a processor (e.g., a central processing unit (CPU), a graphics processing unit (GPU, or both), a main memory and a static memory, which communicate with each other via a bus. The computer system can further include a video display unit (e.g., a liquid crystal display (LCD), a flat panel, a solid state display, or a cathode ray tube (CRT)). The computer system can include an input device (e.g., a keyboard), a cursor control device (e.g., a mouse), a mass storage medium a signal generation device (e.g., a speaker or remote control) and a network interface device.

The mass storage medium can include a computer-readable storage medium on which is stored one or more sets of instructions (e.g., software) embodying any one or more of the methodologies or functions described herein, including those methods illustrated above. The computer-readable storage medium can be an electromechanical medium such as a common disk drive, or a mass storage medium with no moving parts such as Flash or like non-volatile memories. The instructions can also reside, completely or at least partially, within the main memory, the static memory, and/or within the processor during execution thereof by the computer system. The main memory and the processor also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure also contemplates a machine readable medium containing instructions, or that which receives and executes instructions from a propagated signal so that a device connected to a network environment can send or receive voice, video or data, and to communicate over the network using the instructions. The instructions can further be transmitted or received over a network via the network interface device. While the computer-readable storage medium is described in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for managing media content, the method comprising:
    exchanging information with a mobile communication device for establishing a registration for the mobile communication device, the mobile communication device being associated with a user;
    establishing a user profile based upon data entered by the user during the registration for the mobile communication device or in a social media profile of the user; after establishing the registration for the mobile communication device, transmitting a verification signal to the mobile communication device; and
    after receiving a response from the user based on the verification signal, activating the user profile;
    providing the user with access to the media content; receiving a rating or critique of the media content from the user via the mobile communication device, wherein the rating or critique is received while the user is accessing the media content in real time;
    aggregating the rating or critique from a plurality of users into a score or ranking of the media content;
    providing the score or ranking in real time to at least one of an originator or distributor associated with the media content, wherein the score or ranking of the media content can be generated by aggregating a selected plurality of users based on selectable data contained in the user profile; and
    modifying data associated with a social network page associated with the social media profile of the user based on the user being provided with access to the media content or based on the rating or critique received from the user.

2. The method of claim 1, further comprising:
    providing a request for the rating or critique of the media content, the request being based at least in part on a user profile associated with the user; and
    providing the mobile communication device with limited access to the media content in response to the user accepting the request.

3. The method of claim 1, wherein the at least one of the originator or distributor is a media provider and has a playlist that includes the media content, and wherein the playlist is adjusted based at least in part on the rating or critique.

4. The method of claim 1, further comprising providing the user of the mobile communication device with unlimited access to the media content in response to the user requesting purchase of the media content.

5. The method of claim 1, further comprising obtaining and storing keywords associated with the at least one of the originator or distributor and presenting the keywords to the user.

6. The method of claim 1, wherein a playlist of the user is updated based on the rating or critique.

7. A mobile communication system for managing media content comprising:

a server that is adapted to:
exchange information with a mobile communication device for establishing a registration for the mobile communication device, the mobile communication device associated with a user;
establish a user profile based upon data entered by the user during the registration for the mobile communication device or in a social media profile; after establishing the registration for the mobile communication device, transmitting a verification signal to the mobile communication device; and
after receiving a response from the user based on the verification signal, activating the user profile;
provide the mobile communication device with access to media content; receive a rating or critique of the media content from the user via the mobile communication device, wherein the rating or critique is received while the user is accessing the media content in real time;
aggregate the rating or critique from a plurality of users into a score or ranking of the media content; and
transmit the score or ranking in real time to at least one of an originator or distributor associated with the media content, wherein the score or ranking of the media content can be generated by aggregating a plurality of users based on selectable data contained in the user profile.

8. The system of claim 7, wherein the server transmits a request for the rating or critique of the media content to a plurality of mobile communication devices, the request being based at least in part on the user profile associated with each of the plurality of mobile communication devices, and wherein the server provides the access to the media content in response to the user accepting the request.

9. The system of claim 7, wherein a client server is associated with the at least one of an originator and distributor associated with the media content, wherein the client server maintains a playlist that includes the media content, and wherein the playlist is adjusted based at least in part on the critique.

10. The system of claim 9, wherein the critique is a plurality of critiques, and wherein the server stores a plurality of the ratings or critiques and transmits the plurality of ratings or critiques to the client server when a desired sampling size is reached.

11. The system of claim 7, wherein the server awards the user with an award of points based on performing the rating or critique or based on participation in activities managed by the server.

12. The system of claim 9, wherein the server obtains and stores keywords associated with the client server and transmits the keywords to the user.

13. The system of claim 7, wherein a playlist of the mobile communication device is updated based on the rating or critique.

14. The method of claim 1, further comprising preventing the mobile communication device from being registered multiple times with the same website.

* * * * *